US006640277B1

(12) United States Patent
Moertl (10) Patent No.: US 6,640,277 B1
(45) Date of Patent: Oct. 28, 2003

(54) INPUT STAGING LOGIC FOR LATCHING SOURCE SYNCHRONOUS DATA

(75) Inventor: Daniel Frank Moertl, Rochester, MI (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 10/137,059

(22) Filed: May 2, 2002

(51) Int. Cl.$^7$ .............................................. G06F 13/42
(52) U.S. Cl. ........................ 710/305; 710/104; 710/105; 710/60; 710/61; 713/400; 713/600; 375/257; 375/377
(58) Field of Search .......................... 326/93; 327/141, 327/293, 295; 375/257, 377, 219, 355; 713/400, 600; 710/60, 61, 104, 105, 66, 127, 129, 305

(56) References Cited

U.S. PATENT DOCUMENTS

| | | | | |
|---|---|---|---|---|
| 5,723,995 A | * | 3/1998 | Mozdzen et al. | 327/293 |
| 5,768,529 A | * | 6/1998 | Nikel et al. | 709/232 |
| 5,919,254 A | * | 7/1999 | Pawlowski et al. | 710/104 |
| 5,919,265 A | * | 7/1999 | Nishtala et al. | 713/400 |
| 6,178,206 B1 | | 1/2001 | Kelly et al. | |
| 6,199,135 B1 | * | 3/2001 | Maahs et al. | 710/305 |

* cited by examiner

*Primary Examiner*—Michael Tokar
*Assistant Examiner*—Vibol Tan
(74) *Attorney, Agent, or Firm*—Wood, Herron & Evans, LLP

(57) ABSTRACT

A circuit arrangement, program product and method in one aspect utilize three stage input staging logic to receive source synchronous data in a source synchronous communications system such as a PCI-compatible communication system. In another aspect, two stage input staging logic is supplemented by at least one holding latch disposed intermediate the output of the two stage input staging logic and a common clock synchronizing circuit to effectively increase the hold time of a staging latch in one of the latching stages prior to common clock synchronization. The holding latch may be clocked concurrently with at least one other staging latch in the input staging logic that is clocked later in a data phase than the staging latch that feeds the holding latch so that the data clocked into both such staging latches is available for common clock synchronization at roughly the same point in time.

33 Claims, 10 Drawing Sheets

INPUT STAGING LOGIC FOR LATCHING SOURCE SYNCHRONOUS DATA

FIELD OF THE INVENTION

The invention is generally related to data transmission over source synchronous communications interfaces, e.g., interfaces compatible with the PCI-X standard, among others.

BACKGROUND OF THE INVENTION

As computers and computer processors increase in performance, data transfer performance becomes a significant bottleneck on overall system performance, as no processor can run at maximum efficiency if that processor is incapable of quickly obtaining the data upon which it is operating. The particular interface-technology utilized to communicate data between a processor and various peripheral devices such as disk drives and other storage components, display adaptors, network adaptors, etc. in particular can be a significant source of such a bottleneck. In addition, in high performance computers such as servers, mainframe computers, midrange computers, such bottlenecks are particularly problematic due to the significant amount of data that needs to be transmitted between components to handle the heavy workloads to which such computers are commonly subjected.

For communicating with peripheral components, a number of interconnect technologies have been developed over the years. One such interconnect technology is the Peripheral Component Interconnect (PCI) standard, which was originally developed to interface peripheral cards mounted in slots to a local processor in a computer, but which has since been refined through various followup standards to support higher bandwidth applications such as in servers and other high performance computers. One such followup standard is the PCI-X standard, which in Version 1.0 implemented the use of split transactions, as well as a higher clock frequency, to increase the overall bandwidth of a PCI bus.

While the PCI-X standard offers substantially greater performance than the original PCI standard, greater performance is still desirable. However, one limitation to future gains in performance with conventional PCI-compatible standards is due to the system synchronous nature of the communications over a PCI-compatible bus. In particular, with system synchronous communications, a common clock is used system-wide on all components resident on a PCI bus for the purpose of synchronizing the transmission of data across the bus. However, due predominantly to the skewing of signals relative to one another as a result of varying propagation delays between components, the maximum potential transmission frequency obtainable through system synchronous communications is inherently limited. Given also that in some high performance environments, the distance between components can be relatively long, and can vary from component to component, signal propagation delays can further limit the maximum transmission frequency in a system synchronous communication configuration.

In other communications standards, such as a number of existing Double Data Rate (DDR) Synchronous Dynamic Random Access Memory (SDRAM) and Accelerated Graphics Port (AGP) standards, source synchronous data communication is utilized in lieu of system synchronous communication. Source synchronous data communication relies on the component that serves as the source of a data signal to also provide a clock signal (often referred to as a data strobe signal) that is used by a target for the data to capture such data as it is being transferred over a data line to the target. By providing both the data and the clock from the same source, it is assumed that the signal propagation delays of the data and clock to a target will be more closely matched, and as a result, higher clock and data transmission frequencies may be used with reduced risk of transmission errors.

In many source synchronous systems, it is desirable to resynchronize received data in a target with a common or system clock signal, particularly where the received data is transmitted at a common clock-multiplied rate such as double data rate (DDR) or quad data rate (QDR). When data is transmitted at a clock-multiplied rate, multiple samples (or sub-phases) of a data signal are taken within a given cycle of the common clock signal (also referred to as a data phase). Thus, for example, if a common clock signal operates at 33 MHz, a DDR source synchronous data signal would have two sub-phases per data phase, providing an effective 66 MHz transmission rate for the data signal. Likewise, a QDR source synchronous data signal would have four sub-phases per data phase, providing an effective 133 MHz transmission rate.

To perform such resynchronization, input staging logic is typically provided in a target or receiver component to temporarily latch received data until such data can be resynchronized with a common clock. In addition, where clock-multiplied source synchronous transmission is used, samples from multiple sub-phases of each data phase of the data signal must be temporarily stored so that all of the samples can be output in parallel at the relatively slower rate of the common clock signal. Thus, with a 33 MHz common clock, two samples of a DDR data signal, and four samples of a QDR data signal, must be output by an input staging register for each cycle of the common clock.

One particular implementation of input staging logic useful in connection with the AGP standard includes two latching stages to resynchronize source synchronous data to the internal common clock of a target device. Each latching stage has a set of staging latches to store the data from all of the sub-phases for one data phase (i.e., two latches per stage for DDR data, and four latches per stage for QDR data). A sequencer circuit, which is clocked by the data strobe signals provided to the input staging logic, and which functions in much the same manner as a circular buffer, sequentially latches data on the data line into each staging latch in each stage of the input staging logic. For each data phase, a multiplexer coupled to the staging latches, and common clock-driven resynchronizing latch coupled to the output of the multiplexer, latch in parallel all of the data stored in the staging latches in one of the latching stages. The multiplexer is controlled during each subsequent data phase to sequentially route the data stored in the various latching stages to the resynchronizing latch.

While the aforementioned two stage input staging logic is suitable for many DDR and QDR source synchronous applications, in some applications the setup time (i.e., the time for data to propagate to a stable state at the input of a latch) for latching the last sub-phase of a data phase into a resynchronizing latch may be difficult to meet, particularly at higher frequencies. As an example, many standards such as various PCI standards require that data be available to a target device within two common clock cycles from when it is driven on a bus by a source device. As such, the use of conventional two stage input staging logic in such situations may be problematic at higher frequencies, requiring either a restriction on clock frequency (and thus, on overall bandwidth), or more stringent requirements on signal path lengths and switching times to adequately meet setup requirements for resynchronization.

Given the ever-present desires of maximizing bandwidth and maintaining design flexibility, any restrictions on clock frequency and/or constraints on circuit designs are generally not preferred. A need therefore exists for an improved manner of latching source synchronous data into a receiver that does not suffer from the aforementioned limitations of conventional two stage input staging logic.

SUMMARY OF THE INVENTION

The invention addresses these and other problems associated with the prior art by providing a circuit arrangement, program product and method that in one aspect utilize three stage input staging logic to receive source synchronous data in a source synchronous communications system. By incorporating a third latching stage into input staging logic, critical timing parameters such as the setup time for latching a last sub-phase of a data phase are more easily met, thus improving maximum operational frequency and reducing the criticality of signal path lengths, switching times, and other potential sources of delay.

Consistent with one aspect of the invention, source synchronous input staging logic is configured to receive a source synchronous data signal. The input staging logic includes first, second and third latching stages respectively configured to store a plurality of data values from the source synchronous data signal, and sequencer logic coupled to the first, second and third latching stages and configured to sequentially route data values from the source synchronous data signal to the first, second and third latching stages. In addition, common clock synchronizing circuit is coupled to the input staging logic and is configured to synchronize data from the source synchronous data signal to a common clock signal by sequentially latching data values from the first, second and third latching stages.

The invention also provides in another aspect, a circuit arrangement, program product and method that incorporate at least one holding latch intermediate the output of two stage input staging logic and a common clock synchronizing circuit to effectively increase the hold time of a staging latch in one of the latching stages prior to common clock synchronization. The holding latch is clocked concurrently with at least one other staging latch in the input staging logic that is clocked later in a data phase than the staging latch that feeds the holding latch so that the data clocked into both such staging latches is available for common clock synchronization at roughly the same point in time.

Consistent with this other aspect of the invention, source synchronous input staging logic is configured to receive a source synchronous data signal. The input staging logic includes first and second latching stages respectively configured to store a plurality of data values from first and second data phases of the source synchronous data signal. The first latching stage includes first and second staging register latches, where the second staging register latch is configured to receive data from a later sub-phase of the first data phase than the first staging register latch. Sequencer logic is coupled to the first and second latching stages and is configured to sequentially route data values from the source synchronous data signal to the first and second latching stages at least in part by selectively gating the first and second staging register latches. A common clock synchronizing circuit is coupled to the input staging logic and is configured to synchronize data from the source synchronous data signal to a common clock signal by sequentially latching data values from the first and second latching stages. Moreover, the input staging logic additionally includes at least one supplemental holding latch coupled intermediate an output of the first staging register latch and the common clock synchronizing circuit. The supplemental holding latch is gated by the sequencer logic to latch the output of the first staging register latch concurrently with gating of the second staging register latch.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

The embodiments discussed herein support a number of enhancements to conventional two stage input staging logic utilized in connection with clock-multiplied source synchronous communications systems. One such enhancement is the addition of a third latching stage to two stage input staging logic to in effect provide three stage input staging logic. Another such enhancement is the addition of one or more holding latches intermediate the output of two stage input staging logic and common clock synchronizing logic. Each of these enhancements separately address the limitations of the aforementioned conventional two stage input staging logic, and as such each will be discussed separately hereinafter.

Figure 1:
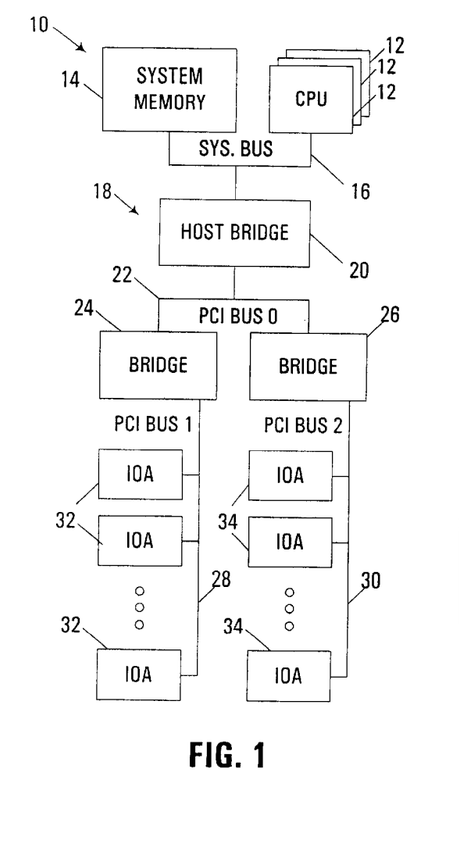
FIG. 1 is a block diagram of an apparatus incorporating a source synchronous communication system consistent with the invention.

Turning to the Drawings, wherein like numbers denote like parts throughout the several views, FIG. 1 illustrates a data processing system or apparatus 10 incorporating a source synchronous input staging logic design consistent with the invention. Apparatus 10 is shown with one or more processors 12 coupled to a system memory 14 via a system bus 16. A source synchronous communications system 18, implemented in the illustrated embodiment as a PCI-X Version 2.0-compatible communications system, is shown interfaced with system bus 16 via a host bridge 20. Defined within system 18 is a primary PCI bus 22, which as shown in FIG. 1 may be interfaced via one or more bridges 24, 26 to support additional PCI buses such as PCI buses 28, 30. One or more PCI-compatible devices, generically denoted herein as input/output adaptors (IOA's) 32, 34, are coupled to each PCI bus 28, 30.

It will be appreciated that any combination of PCI buses, bridges and PCI-compatible devices may be utilized in apparatus 10 consistent with the invention, including configurations as simple as a single PCI-compatible device coupled to a single PCI bus. Moreover, it will be appreciated that any number of form factors of devices, buses, bridges and the like may be used consistent with the invention. Moreover, any number of peripheral components configured for use with a PCI bus and capable of receiving source synchronous data over a PCI bus may utilize the herein-described input staging logic, including various network adaptors, storage adaptors, sound cards, video or display adaptors, RAID adaptors, etc. Furthermore, the herein-described logic may be utilized in practically any other component capable of serving as a target or receiver in a PCI-compatible system, including a bridge device, a memory controller, a chipset, etc.

It should be recognized that the term "apparatus" may be considered to incorporate various data processing systems such as computers and other electronic devices, as well as various components within such systems, including individual integrated circuit devices or combinations thereof. Moreover, within an apparatus may be incorporated one or more circuit arrangements, typically implemented on one or more integrated circuit devices, and optionally including additional discrete components interfaced therewith.

It should also be recognized that circuit arrangements are typically designed and fabricated at least in part using one or more computer data files, referred to herein as hardware definition programs, that define the layout of the circuit arrangements on integrated circuit devices. The programs are typically generated in a known manner by a design tool and are subsequently used during manufacturing to create the layout masks that define the circuit arrangements applied to a semiconductor wafer. Typically, the programs are provided in a predefined format using a hardware definition language (HDL) such as VHDL, verilog, EDIF, etc. Thus, while the invention has and hereinafter will be described in the context of circuit arrangements implemented in fully functioning integrated circuit devices, those skilled in the art will appreciate that circuit arrangements consistent with the invention are capable of being distributed as program products in a variety of forms, and that the invention applies equally regardless of the particular type of signal bearing media used to actually carry out the distribution. Examples of signal bearing media include but are not limited to recordable type media such as volatile and non-volatile memory devices, floppy disks, hard disk drives, CD-ROM's, and DVD's, among others, and transmission type media such as digital and analog communications links.

As discussed above, the principles of the invention may be applicable to the input staging registers utilized in practically any source synchronous communications interface, in particular, where the input staying logic receives both a data signal and a data strobe signal from a given source, and where it is desirable to synchronize such data to an internal clock on a receiver or target device. One such exemplary source synchronous communications interface is a DDR and/or QDR enabled PCI-X communications interface. However, other clock-multiplied communication interfaces, e.g., AGP interfaces, other PCI interfaces, SDRAM interfaces, etc., may also benefit from the principles discussed herein. The invention therefore should not be limited solely to use in the herein-described PCI-X-compatible environment.

Figure 2:
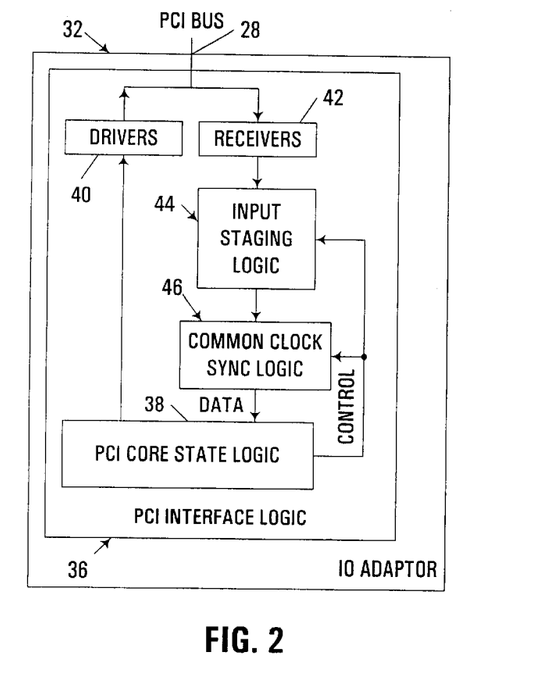
FIG. 2 is a block diagram of an Input/Output Adaptor (IOA) implementing input staging logic consistent with the invention.

FIG. 2 next illustrates by way of example a PCI-X implementation of an I/O Adaptor (IOA) 32 incorporating input staging logic consistent with the invention. To interface with a PCI-X compatible bus 28, PCI interface logic 36 is incorporated into IOA 32. Other logic circuitry, which will vary considerably based upon the end use of the IOA 32, is incorporated into the IOA, but is not shown in FIG. 2.

PCI interface logic 36 in the illustrated implementation is compatible with the PCI-X Version 2.0 standard, and includes both driver and receiver circuitry to alternatively transmit data over bus 28 and receive data over bus 28 as necessary under the control of PCI core state logic 38. As is well known in the art, a set of drivers 40 and receivers 42 electrically interface the IOA with bus 28. Transmitted data output on the bus by drivers 40 is generated by logic 38, also in a manner known in the art. Received data detected on the bus by receivers 42 is forwarded logic 38 for handling in a manner known in the art, by way of input staging logic 44 and common clock synchronization logic 46, each of which is controlled by logic 38. It will be appreciated that the use and configuration of components 38, 40, and 42 are well understood in the context of the PCI standard, so no further discussion of these components is provided herein.

Figure 3:
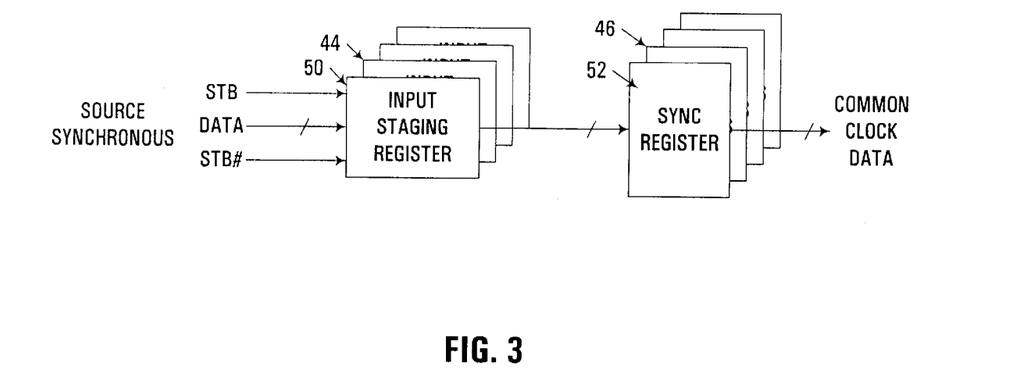
FIG. 3 is a block diagram illustrating in greater detail the principal logic circuitry in the input staging logic and common clock synchronization logic of FIG. 2.

FIG. 3 next illustrates an exemplary implementation of input staging logic 44 and common clock synchronization logic 46 for use in connection with the PCI-X Version 2.0 standard. For this standard, the source synchronous lines on a PCI bus are grouped into four bundles, with each bundle having two complementary clock or data strobe lines, denoted herein as STB and STB#, and between 16 and 20 data lines, denoted herein as DATA. The DATA lines include 16 Address/Data (AD) lines, and up to 4 ECC lines; however, from the perspective of the input staging logic, all DATA lines carry source synchronous data.

To handle the staging and common clock synchronization of the source synchronous data in the four bundles, four input staging registers 50 and four synchronization registers 52 are incorporated respectively into input staging logic 44 and common clock synchronization logic 46. One each of registers 50 and 52 are thus allocated for each bundle. Moreover, as will become more apparent below, coupled between each register pair 50, 52 are a plurality of lines, either 8 or 12 lines for each of the DATA lines, depending upon whether the input staging logic is a two or three stage design. Output from each synchronization register 52 are between 64 and 80 common clock synchronized data lines, four for each of the DATA lines, thus permitting the parallel transfer of four bits of QDR data at the frequency of the common clock. For input staging logic that supported only the transfer of DDR data, only half of the lines between registers 50, 52 and output from register 52 would be required; however, in the illustrated embodiment, both DDR and QDR transfer is supported, so the full complement of data lines is provided, with only half of such lines actually used when transmitting data in a DDR mode.

Figure 3A:
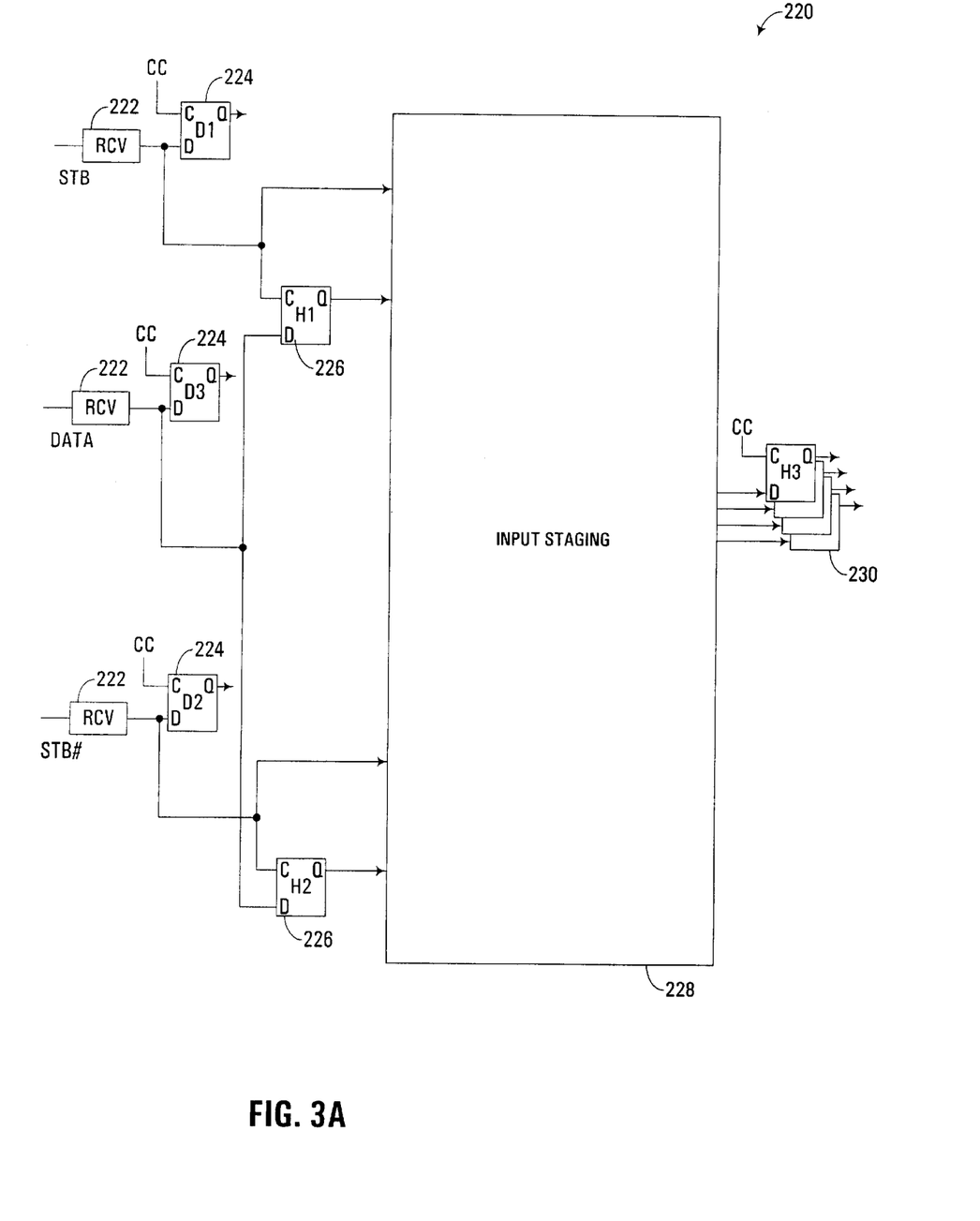
FIG. 3A is a block diagram illustrating in another way the principal logic circuitry in the input staging logic and common clock synchronization logic of FIG. 2.

Next, FIG. 3A illustrates the minimum data reception circuitry 220 to be required for compliance with the PCI-X Version 2.0 standard for latching incoming source synchronous data. Circuitry 220 includes receivers 222 coupled to receive each of the DATA, STB and STB# signals, and configured to output the respective signals to a set of D latches 224. D latches 224, which are also denoted as latches D1–D3, are used to latch non-source synchronous, data from the PCI bus, and as such, each D latch is clocked by a common clock (CC) signal. Each of the DATA, STB and STB# signals is also coupled to a pair of H latches 226, also designated as latches H1 and H2. The DATA signal is supplied to D inputs of latches H1 and H2, while the STB signal is supplied to the clock input of latch H1, and the STB# signal is supplied to the clock input of latch H2. The Q outputs of both latches H1 and H2, as well as the STB and STB# signals, are then provided to an input staging block 228, which is used to present either two (DDR) or four (QDR) samples of the DATA signal during each cycle of the common clock signal, as an output for latching by a set of four CC signal gated H latches 230 (also designated as latches H3).

The specific circuitry of input staging block 228 is not defined by the PCI-X Version 2.0 standard, and the discussion hereinafter will focus on a number of implementations that implement the functionality of block 228, and that are intended to provide reliable high data rate source synchronous communications in a manner that is in compliance with the PCI-X Version 2.0 standard. In this regard, two principal enhancements are disclosed herein to address a number of difficulties found in conventional two stage input staging logic. The first is based upon the use of an additional stage to in effect provide a three stage input staging logic design, while the second is based upon the use of supplemental holding latches to address potential setup time problems found in a two stage input staging logic design. Each of these enhancements are discussed in greater detail below.

Three Stage Input Staging Logic Design

Figure 4:
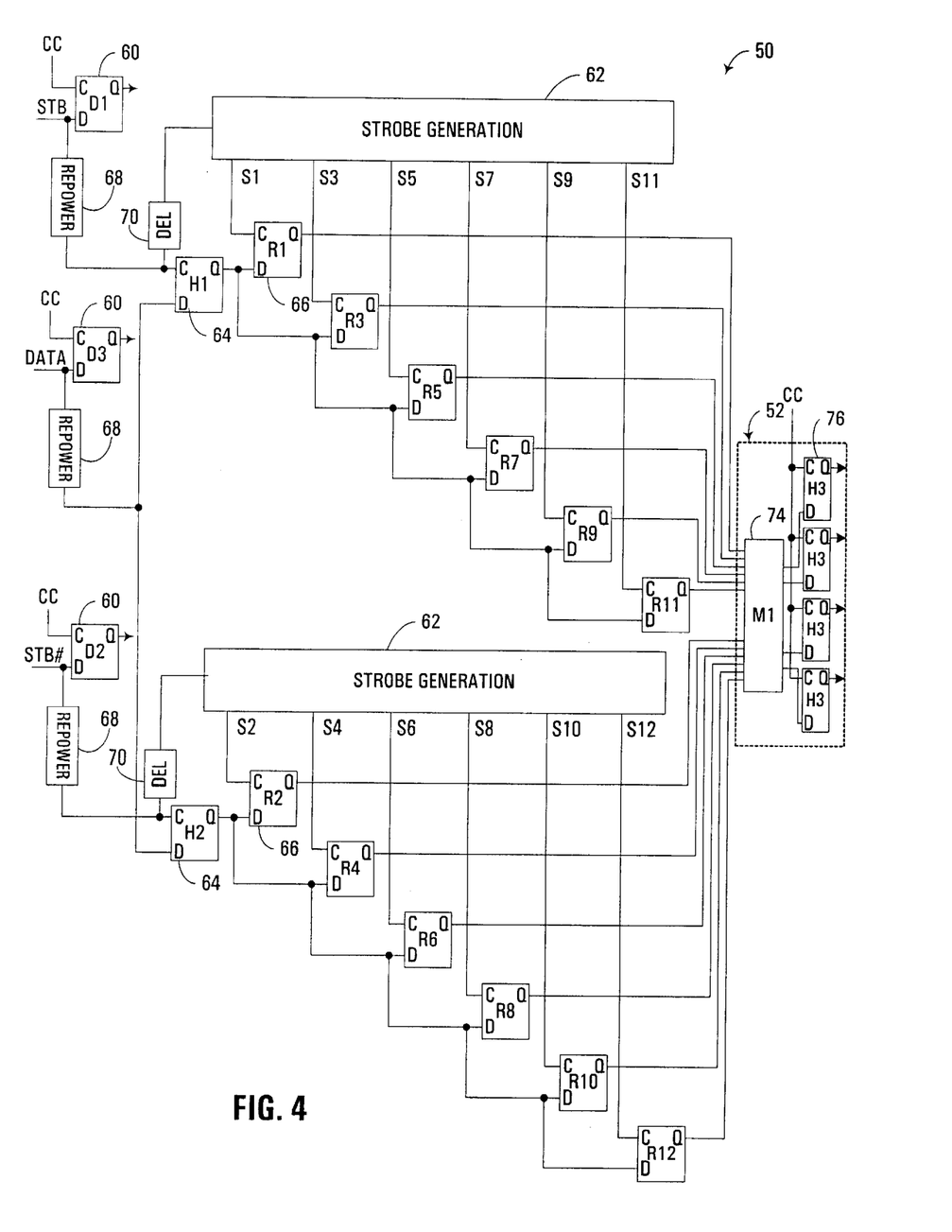
FIG. 4 is a block diagram of one implementation of an input staging register and synchronization register referenced in FIG. 3, incorporating a three stage input staging logic design consistent with the invention.

FIG. 4 illustrates an exemplary three stage input staging logic design implemented within an input staging register 50 consistent with the invention. For each of the STB and STB# lines, there is one D latch 60 and strobe generation logic 62. For each DATA line, there is one D latch 60, two H latches 64, and twelve R latches 66. Moreover, coupled to the output of the twelve R latches 66 is a multiplexer 74 coupled to four H latches 76 (also denoted as H3 latches), all of which are incorporated within a synchronization register 52. All of latches 60, 64, 66 and 76 may be implemented in the illustrated embodiment using D-type flip flops, although other latch designs may be used in the alternative. Moreover, in many embodiments, the D latches 60 and-strobe generation logic 62 utilized for each data strobe signal can be used to provide suitable inputs for all DATA lines in a bundle.

The signals in a bundle are source synchronous only during the data phases of a block write or split completion in DDR or QDR mode. At all other times, those signals are used in the common clock domain, and as such, it is desirable to incorporate a D latch 60 (denoted separately in FIG. 4 as latches D1, D2 and D3) as close to the receiver as possible to minimize loading and delay between the receiver and the latches. Each D latch 60 is clocked by a common clock signal (CC) and outputs a common clock synchronized representation of the respective STB, STB# and DATA signals.

Each of the STB, STB# and DATA signals may also optionally be coupled to a repower block 68 to minimize the load placed upon the D latches 60 or the rest of the input staging register design. In addition, delay blocks 70 (e.g., implemented as delay lines) are coupled between each data strobe signal STB/STB# and the strobe generation logic 62. The strobe generation logic 62 functions as sequencer logic, outputting a number of odd-numbered staging strobe signals denoted as S1, S3, S5, S7, S9 and S11 responsive to the STB signal, and a number of even-numbered staging strobe signals denoted as S2, S4, S6, S8, S10 and S12 responsive to the STB# signal.

In the illustrated embodiment, the odd and even portions of the strobe generation logic are each configured to cycle between asserting either one or two of the staging strobe signals at a time in a numerically increasing order. In QDR mode, for example, a single staging strobe signal is asserted at a time in each of the odd and even portions of the strobe generation logic, and upon each rising edge of the respective STB/STB# signal, the respective portion is incremented to assert the next staging strobe signal in the sequence, and wrapping around after the last staging strobe signal in the sequence has been asserted. Thus, for example, for the odd portion of the strobe generation logic, the odd-numbered staging strobe signals are sequentially asserted in the order S1-S3-S5-S7-S9-S11-S1-S3 . . . ect., with one odd-numbered staging strobe signal asserted shortly after each rising edge of the STB signal. Likewise, the even portion of the strobe generation logic sequentially asserts the even-numbered staging strobe signals in the order S2-S4-S6-S8-S10-S12-S2-S4 . . . etc. In DDR mode, a similar numerically-increasing sequence is generated, but with two of the staging strobe signals in each odd/even set asserted at a time (e.g., for the odd-numbered staging strobe signals, S1&S7-S3&S9-S5&S11-S1&S7 . . . etc.). Also, in some embodiments, the S7–S12 staging strobe signals would not even need to be asserted in DDR mode, whereby the assertion sequence would be, for the odd set of staging strobe signals, S1-S3-S5-S1-S3 . . . etc., and for the even set of staging strobe signals, S2-S4-S6-S2-S4 . . . etc.

The strobe generation circuit may be implemented in a number of manners to sequentially assert the staging strobe signals so as to appropriately latch the R latches 66 in the -manner that will be described in greater detail below. For example, any of a latch ring, a circular buffer, a counter/decoder arrangement, etc. may be used to sequentially assert the S1-S12 staging strobe signals. Moreover, in other embodiments, the H1 and H2 latches could be omitted, with a combination of a counter and a decoder used to gate the routing of the data -strobe signal to the R latches. Other variations for latching data into the R latches responsive to the STB and STB# signals may be used in the alternative.

The H1 and H2 latches are source synchronous latches that are respectively latch samples (or sub-phases) from the DATA signal on the rising edges of the respective STB and STB# signals. The output of the H1 latch is provided at the D input of each of odd-numbered R latches R1, R3, R5, R7, R9 and R11. Likewise, the output of the H2 latch is provided to the D inputs of the even-numbered R latches R2, R4, R6, R8, R10 and R12.

Each of the R latches functions as a staging register latch, and is clocked by the output of the correspondingly-numbered staging strobe signal, i.e., latch Rx is clocked by the staging strobe signal Sx, where x=1 . . . 12. It should be noted that each DATA input has three loads, one common clock latch D3 and two source synchronous latches (latches H1 and H2). The STB signal has between 18 and 22 loads, one common clock latch (D1), 16–20 data latches (H1), and one delay block. Likewise, the STB# signal has between 18 and 22 loads, one common clock latch (D2), 16–20 data latches (H2), and one delay block. It is desirable for the latency from the STB signal to H1, the DATA signal to H1, the STB# signal to H2, and the DATA signal to H2 all be kept the same. As discussed above, some repowering may be added, which may increase overall latency, so long as the skew between the STB and STB# and DATA signals is kept low.

The setup and hold timing for the H1 and H2 latches is typically important for proper operation, and may be degraded by a number of causes, including the STB/STB# signals at the source not being exactly centered on the DATA signal, a difference in board wire lengths within a bundle, driver duty cycle variations, variations between drivers, and differences in data patterns. The STB, STB# total latency typically does not affect the H1, H2 latch setup and hold timings, but may affect that of the H3 (common clock) latch.

Based upon whether DDR or QDR data is to be received into input staging register 50, different initial values need to be stored in strobe generation circuit 62 prior to the data phase of a PCI transaction. In QDR mode, a single '1' binary value is rotated through each set of even/odd staging strobe signals, while in DDR mode, only three of the staging strobe signals in each set are used. As such, the input staging register is configured to initialize the strobe generation logic to one of two possible states based upon the transmission data rate. For DDR mode, the strobe generation logic is initially configured to output the following staging strobe signals prior to the data phase of a transaction:

S1=0 S3=0 S5=1 S7=0 S9=0 S11=1
S2=0 S4=0 S6=1 S8=0 S10=0 S12=1

Likewise, for QDR mode, the strobe generation logic is initialized as follows:

S1=0 S3=0 S5=0 S7=0 S9=0 S11=1
S2=0 S4=0 S6=0 S8=0 S10=0 S12=1

The initialization of the strobe generation logic may be performed by logic circuitry disposed in the input staging register, or alternatively by other logic, e.g., under the control of PCI core state logic 38 (FIG. 2).

Figure 5:
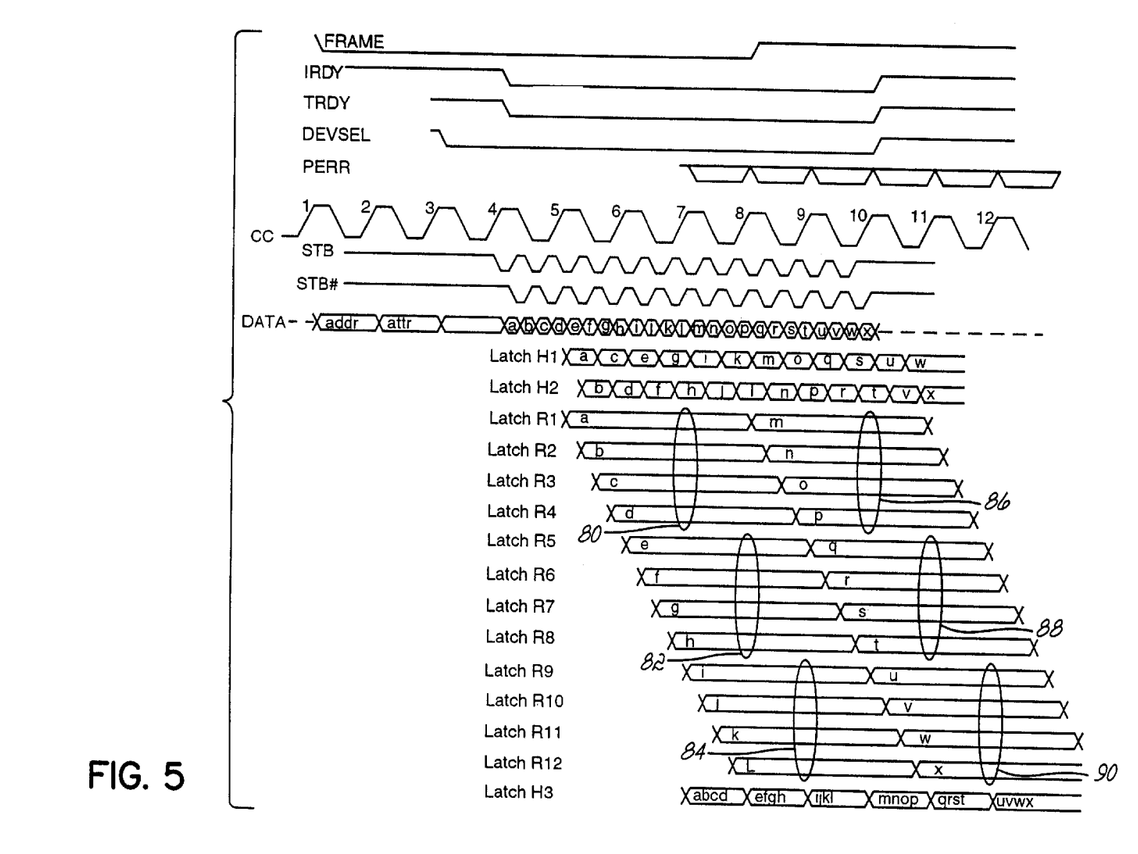
FIG. 5 is a timing diagram illustrating the operation of the input staging logic design of FIG. 4.

FIG. 5 illustrates the timing of an exemplary QDR transaction in connection with the input staging logic design of FIG. 4. In this figure, the FRAME, IRDY, TRDY, DEVSEL, PERR and common clock (CC) signals have the timing as defined in the PCI-X Version 2.0 standard. Also shown is the complementary data strobe signals STB and STB# and an exemplary DATA signal, all shown from the perspective of the source.

As shown in FIG. 5, the source starts to drive the source synchronous data on common clock 4. It is desirable for the input staging logic to gate off (force to '1'b) the STB and STB# inputs at the repowering blocks until the start of clock 4, since prior to that STB, STB# are used for common clock functions. At the start of clock 4 STB and STB# are set to '1'b at the receiver. Also prior to the start of clock 4, the initial bit pattern described above is loaded into the strobe generation logic.

Upon the initiation of the data phase of the transaction, at clock 4 of the common clock, the rising edge of the first STB latches the first sample "a" of the DATA signal in the H1 latch (24 data samples "a"–"x" are illustrated in the figure). STB is then delayed and used to increment the odd portion of the strobe generation logic, thus resulting in the assertion of the S1 staging strobe signal shortly thereafter, thus resulting in the H1 latch data being shifted into the R1 latch.

On the second rising edge of STB a new DATA sample "c" is latched in H1, after a small delay the odd portion of the strobe generation logic is incremented to assert the S3 staging strobe signal, causing the H1 data to be shifted into the R3 latch. This continues for subsequent rising edges of STB, thus loading DATA samples "e", "g", "i" and "k" into latches R5, R7, R9, and R11, respectively. On a second cycle through the input staging register, latches R1, R3, R5, R7, R9 and R11 respectively store DATA samples "m", "o", "q", "s", "u" and "w".

It should be noted that it is desirable in the illustrated embodiment for the delay block to be sufficiently long enough to provide an adequate H1 latch to R latch setup time verses the clocking of the R latch by the corresponding staging strobe signal, but not too long to cause a hold problem since the H1 latch changes every 3.75 ns in QDR mode.

The STB# signal, H2 latch, even portion of the strobe generation logic, and R2, R4, R6, R8, R10, and R12 latches work in a similar manner, latching even-numbered samples of the DATA-signal on each rising edge of the STB# signal. As such, during a first pass through the input staging register, latches R2, R4, R6, R8, R10 and R12 respectively store data samples "b", "d", "f", "h", "j" and "l", and on a second pass, latches R2, R4, R6, R8, R10 and R12 respectively store data samples "n", "p", "r", "t", "v" and The R latches are used to hold the DATA signal samples so that the samples can be synchronized from the source synchronous domain into the common clock domain. As such, the R latch values are multiplexed by multiplexer 74 and then latched by the common clock latch H3. As such, multiplexer 74 is configured to alternate between passing the outputs of R latches R1–R4, R5–R8 and R9–R12 to latch H3. It may therefore be seen that latch H3 latches during each common clock cycle data samples "a"–"d", "e"–"h", "i"–"l", "m"–"p", "q"–"t", and "u"–"x" (represented in FIG. 5 at 80, 82, 84, 86, 88 and 90, respectively).

In FIG. 5, the last clock used to latch data into the H3 latch is clock 12, so starting on clock 11 the repower logic should again gate off STB, STB# (force to '1'b). This is desirable since STB, STB# will typically be used for common clock functions after that. Even with worst case timing, the last STB# rising edge would have been seen at the receiver just before clock 11, so both STB and STB# would both be '1'b at the repower logic at this time.

A PCI-X net driven on clock 5 would have a setup time at the receiver for clock 6 of 1.2 ns so then the strobe for data "d" would have a worst case setup to clock 6 of 2.13 ns (at 133 MHz, and assuming the delay and driver characteristics are similar to the PCI-X Version 1.0 standard). To provide adequate setup time for STB# to propagate through the receiver, delay block, strobe generation circuit, R4 latch, multiplexer and make the common clock setup for latch H3, clock 7 should be used for latch H3. Doing so would also avoid any hold problem for latch H3 since the STB for data "m" would be driven after clock 7.

For a DDR mode, the data strobe signals STB and STB# are driven at the same frequency as the common clock signal (verses the doubled frequency in QDR mode). As such, during each common clock cycle only two DATA signal samples are latched into the R latches, and as such, only the outputs of the R1–R6 latches are used. Due to the initial pattern stored in the strobe generation circuit, the R7–R12 latches may store redundant data simultaneously with the R1–R6 latches, however, the multiplexer is desirably configured to ignore these outputs. As such, during each common clock cycle, the multiplexer should be configured to alternate between passing the outputs of R1–R2, R3–R4 and R5–R6 to the H3 latch.

As such, it may be seen that, when in QDR mode, the three latching stages of the input staging register are defined by latches R1–R4, R5–R8 and R6–R12. In contrast, in DDR mode, the three latching stages are defined by latches R1–R2, R3–R4 and R5–R6.

Figure 11:
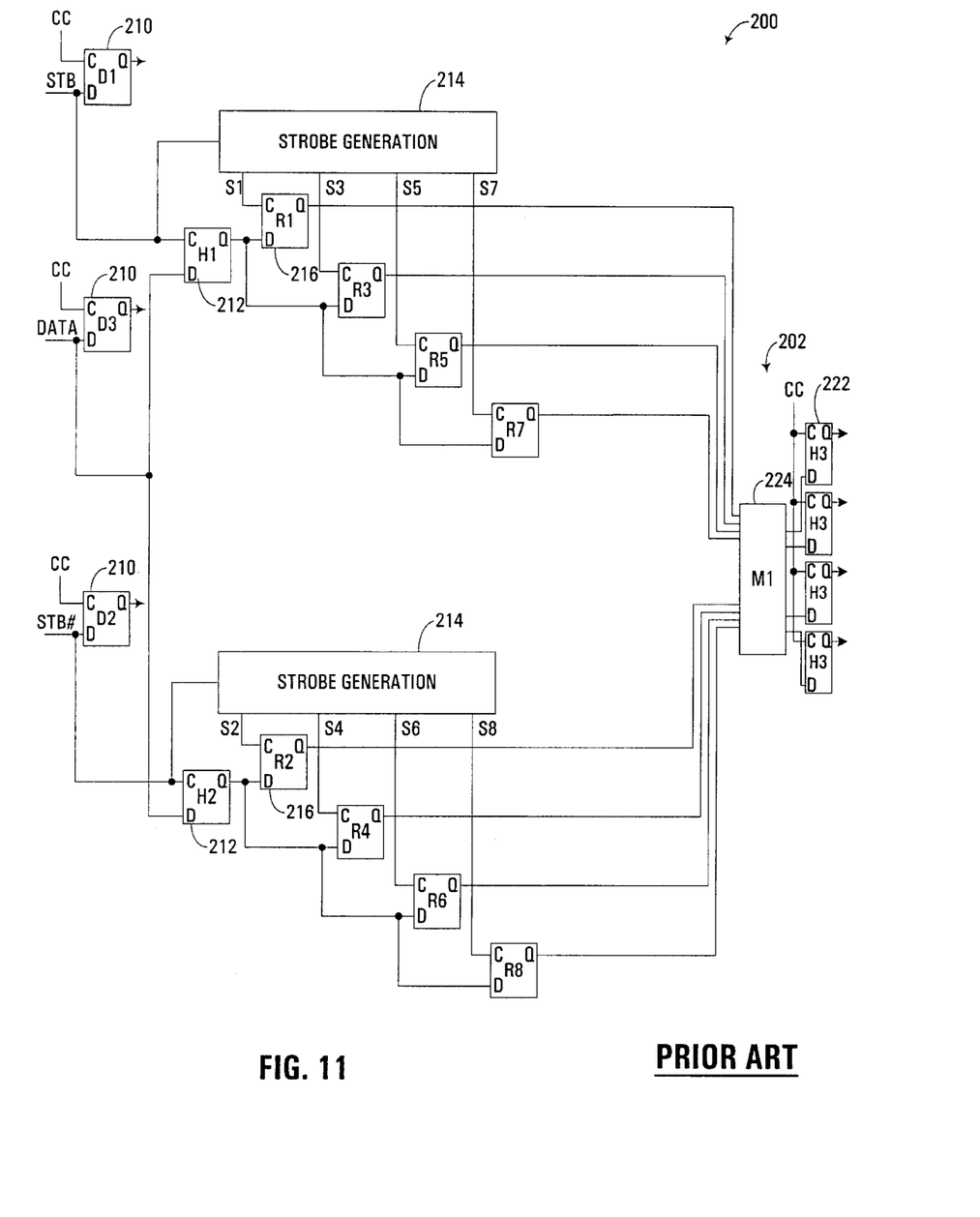
FIG. 11 is a block diagram of a prior art two stage input staging logic design.

For the purposes of comparison, FIG. 11 illustrates a prior art two stage input staging logic design, including an input staging register 200 and synchronization register 202. Register 200 includes D latches 210, H latches 212, strobe generation logic 214, and R latches 216, and register 202 includes four H3 latches 222 and an M1 multiplexer 224. Multiplexer 224 is configured such that in QDR mode the multiplexer alternates between passing the outputs of two latching stages (latches R1–R4 and R5–R8), and in DDR mode the multiplexer alternates between passing the outputs of latches R1–R2 and R3–R4.

The initial assertion pattern for the strobe generation logic in register 200 in DDR mode would be as follows:

S1=0 S3=1 S5=0 S7=1
S2=0 S4=1 S6=0 S8=1

Likewise, for QDR mode, the assertion pattern for the strobe generation logic in register 200 would be initialized as follows:

S1=0 S3=0 S5=0 S7=1
S2=0 S4=0 S6=0 S8=1

Register 50 of FIG. 4 therefore differs from prior art register 200 of FIG. 11 based upon the addition of a third stage of R latches (latches R9, R10, R11, and R12) and corresponding staging strobe signal outputs in the strobe generation logic (staging strobe signals S9, S10, S11 and S12), as well as the addition of the optional repower blocks 68 and delay blocks 70. Likewise, register 52 differs from register 202 based upon the substitution of multiplexer 74 for multiplexer 224.

The timing of the conventional two staging input staging logic design as described above is illustrated in FIG. 6. Under this scenario, one would be motivated to clock latch H3 at clock 6 to minimize the latency to the common clock. As such, latching of data samples "a"–"x" into the H3 latch would occur as shown at 100, 102, 104, 106, 108 and 110 in FIG. 6.

Figure 6:
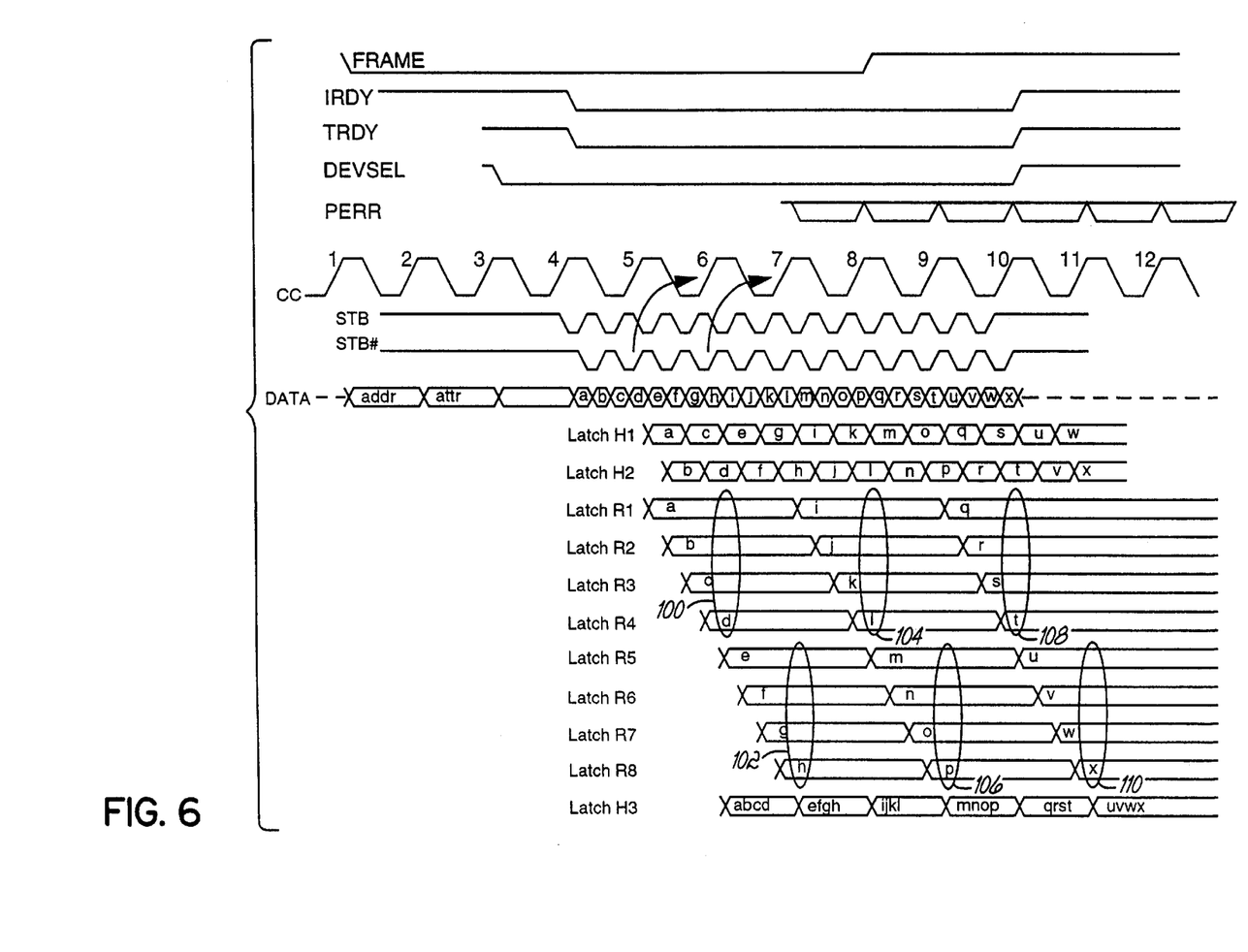
FIG. 6 is a timing diagram illustrating the potential setup time problem associated with a two stage input staging logic design.

However, under this scenario, the setup times from R4 to H3 and R8 to H3 would be problematic. In particular, for latching the first four bits of data, the delay from the second rising edge of STB#, through the delay block, strobe generation logic, latch R4, the multiplexer and to the input of latch H3 would be difficult to meet at a 133 MHz common clock frequency. A similar problem would exist on the fourth rising edge of STB#, where the delays to get the latched data to propagate from latch R8 to the input of latch H3 would possibly provide inadequate setup time for the H3 latch.

One potential solution that might be attempted to address the setup time problems associated with this design would be to clock latch H3 at clock 7; however, this would introduce a hold time problem with the R1 and R5 latches. Moreover, this hold time problem would increase at slower clock speeds.

Thus, the herein-described three stage input staging logic design improves upon the conventional two stage input staging logic design in high data rate applications, providing adequate setup and hold times throughout the operating range of the PCI-X Version 2.0 standard.

Two Stage Input Staging Logic Design with Supplemental Holding Latches

While the aforementioned three stage input staging logic design addresses many of the problems associated with a conventional two stage input staging logic design, it may also be possible to address many of the same problems through the selective addition of one or more holding latches to the conventional two stage design to address specific setup and hold time issues.

Figure 7:
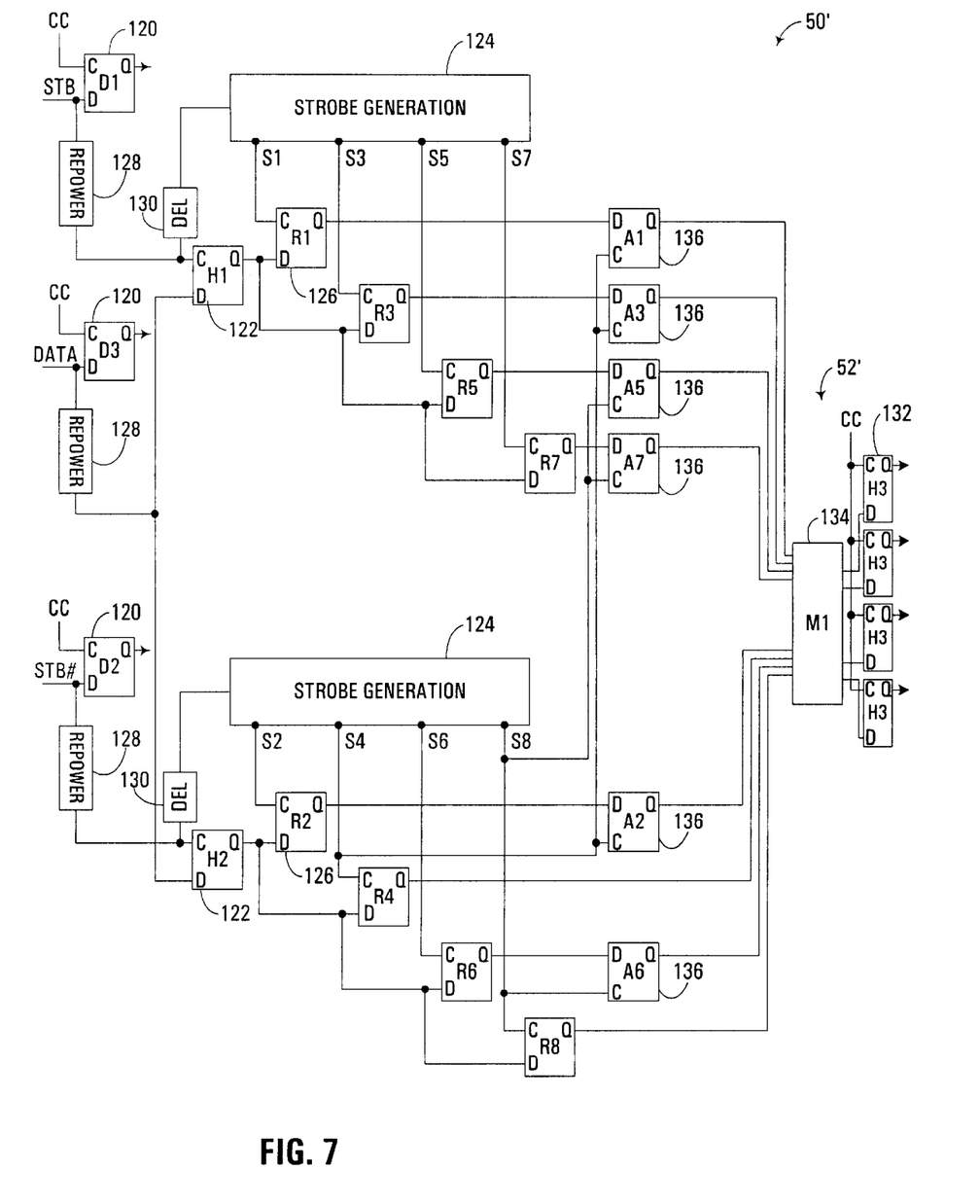
FIG. 7 is a block diagram of another implementation of an input staging register and synchronization register referenced in FIG. 3, incorporating a modified two stage input staging logic design consistent with the invention.

For example, FIG. 7 illustrates an alternate input staging register 50' including a similar configuration of D latches 120, H latches 122, strobe generation logic 124, and R latches 126 as is found in a conventional two stage input staging register design, as well as the aforementioned optional repower blocks and delay blocks, numbered here as 128 and 130, respectively.

Register 50' differs from a conventional design, however, through the addition of several supplemental holding latches 136 disposed intermediate several R latches and the multiplexer, and used to, effectively extend the hold times of a number of the R latches to enable common clocking of the data into the H3 latch to be delayed one clock cycle, at clock 7. Specifically, A1, A2, A3, A5, A6 and A7 latches are respectively coupled to the outputs of the R1, R2, R3, R5, R6 and R7 latches. The A1, A2, and A3 latches are clocked concurrently with the R4 latch by the S4 staging strobe signal, and the A5, A6 and A7 latches are clocked concurrently with the R8 latch by the S8 staging strobe signal.

In addition, an alternate synchronization register 52' includes four H3 latches 132 and an eight input/four output M1 multiplexer 134. In QDR mode, M1 multiplexer 134 is configured to alternately pass through data from the two stages of the input staging register (latches A1–A3 and R4 and latches A5–A7 and R8).

However, in DDR mode, M1 multiplexer 134 is configured to alternately pass through data from latches A3 and R4, and latches A7 and R8. In addition, the strobe generation logic is reconfigured so that the S3 and S7 staging strobe signals, and the S4 and S8 staging strobe signals, respectively alternate being asserted upon each assertion of their respective STB/STB# signals, with the S3 and S4 staging strobe signals initially being asserted (i.e., with assertion sequences of S3-S7-S3-S7-S3-S7 . . . etc. and S4-S8-S4-S8-S4-S8 . . . etc.).

Figure 8:
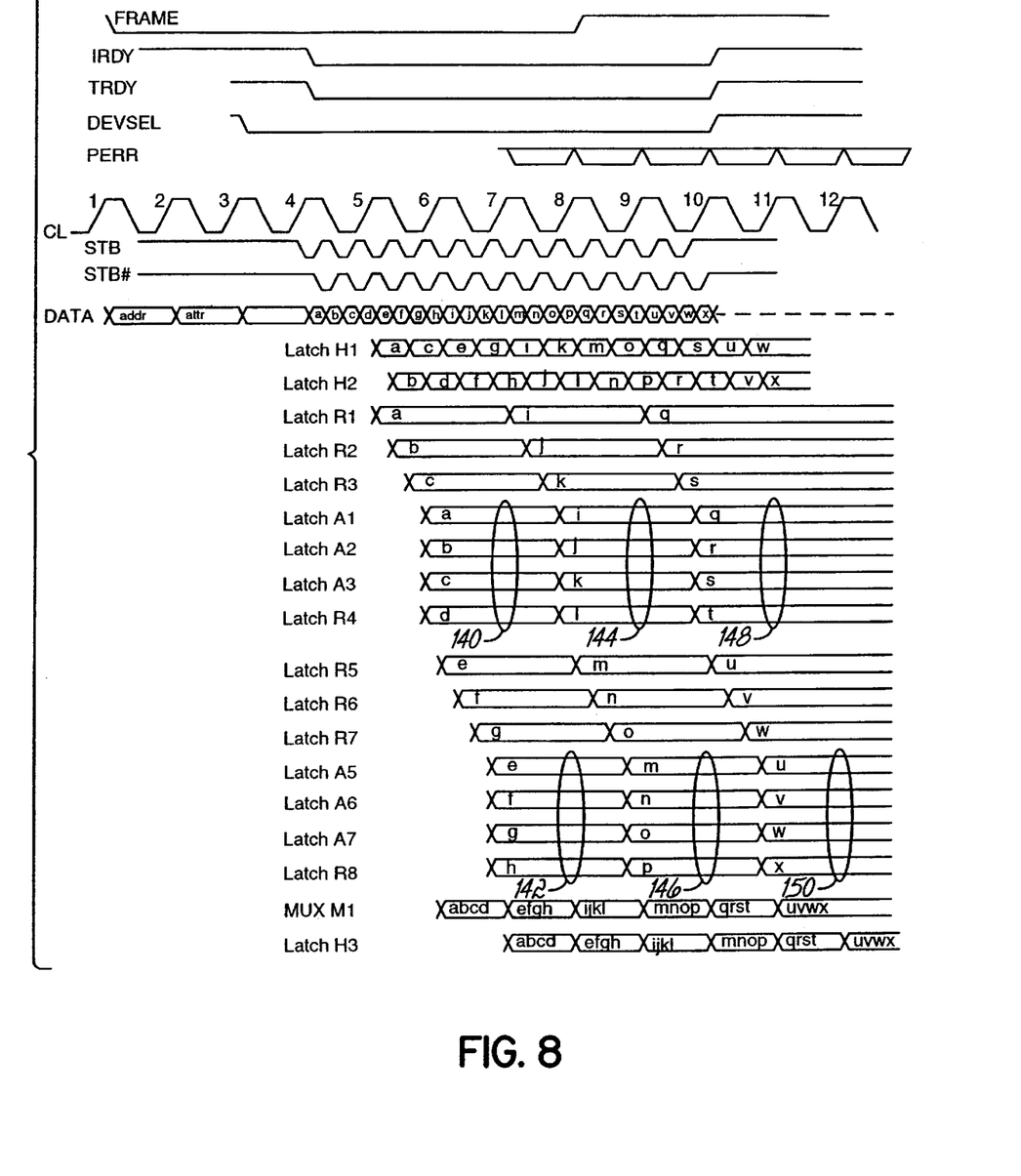
FIG. 8 is a timing diagram illustrating the operation of the input staging logic design of FIG. 7.

As shown in FIG. 8, latching of the data in each clock occurs as shown at 140, 142, 144, 146, 148 and 150. The effect of the addition of latches A1–A3 and A5–A7 is that latching of data in the H3 latch can be obtained in clock 7 without a hold problem with respect to the first sub-phase in each data phase (i.e., the data latched by latches R1 and R5). However, a possibility does exist that the possibility of an H3 latch hold problem may be more pronounced, as may a potential A3 setup problem, as at 133 MHz, there is only a 1.875 ns period of time from when latch R3 is clocked until the R3 data is clocked into latch A3.

Figure 9:
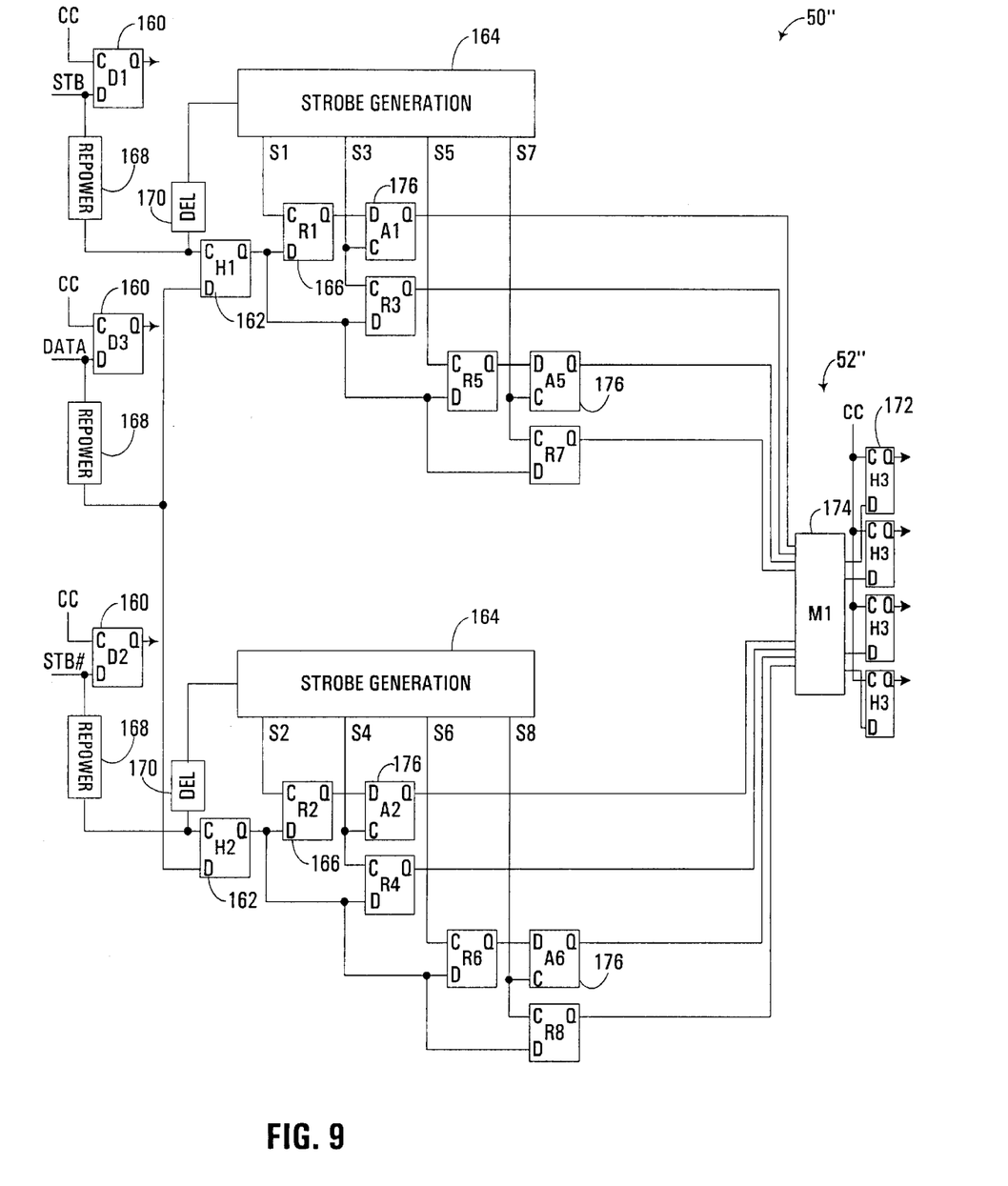
FIG. 9 is a block diagram of yet another implementation of an input staging register and synchronization register referenced in FIG. 3, incorporating a modified two stage input staging logic design consistent with the invention.

Yet another possible input staging register implementation 50''' is illustrated in FIG. 9, including a similar configuration of D latches 160, H latches 162, strobe generation logic 164, and R latches 166 as is found in a conventional two stage input staging register design, as well as optional repower blocks and delay blocks, numbered here as 168 and 170.

Register 50" differs from a conventional design, however, through the addition of several supplemental holding latches 176 disposed intermediate several R latches and the multiplexer, and used to effectively extend the hold times of a number of the R latches to enable common clocking of the data into the H3 latch to be delayed one clock cycle, at clock 7. Specifically, A1, A2, A5 and A6 latches are respectively coupled to the outputs of the R1, R2, R5, and R6 latches, and are clocked by the immediately succeeding assertion of the corresponding data strobe STB/STB#. In particular, the A1 latch is clocked by the S3 staging strobe signal, the A2 latch is clocked by the S4 staging strobe signal, the A5 latch is clocked by the S7 staging strobe signal, and the A6 latch is clocked by the S8 staging strobe signal.

In addition, an alternate synchronization register 52" includes four H3 latches 172 and an eight input/four output M1 multiplexer 174. In QDR mode, M1 multiplexer 134 is configured to alternately pass through data from the two stages of the input staging register (latches A1, A2, R3 and R4 and latches A5, A6, R7 and R8).

However, in DDR mode, this design is essentially functionally equivalent to the conventional two stage input staging logic design.

Figure 10:
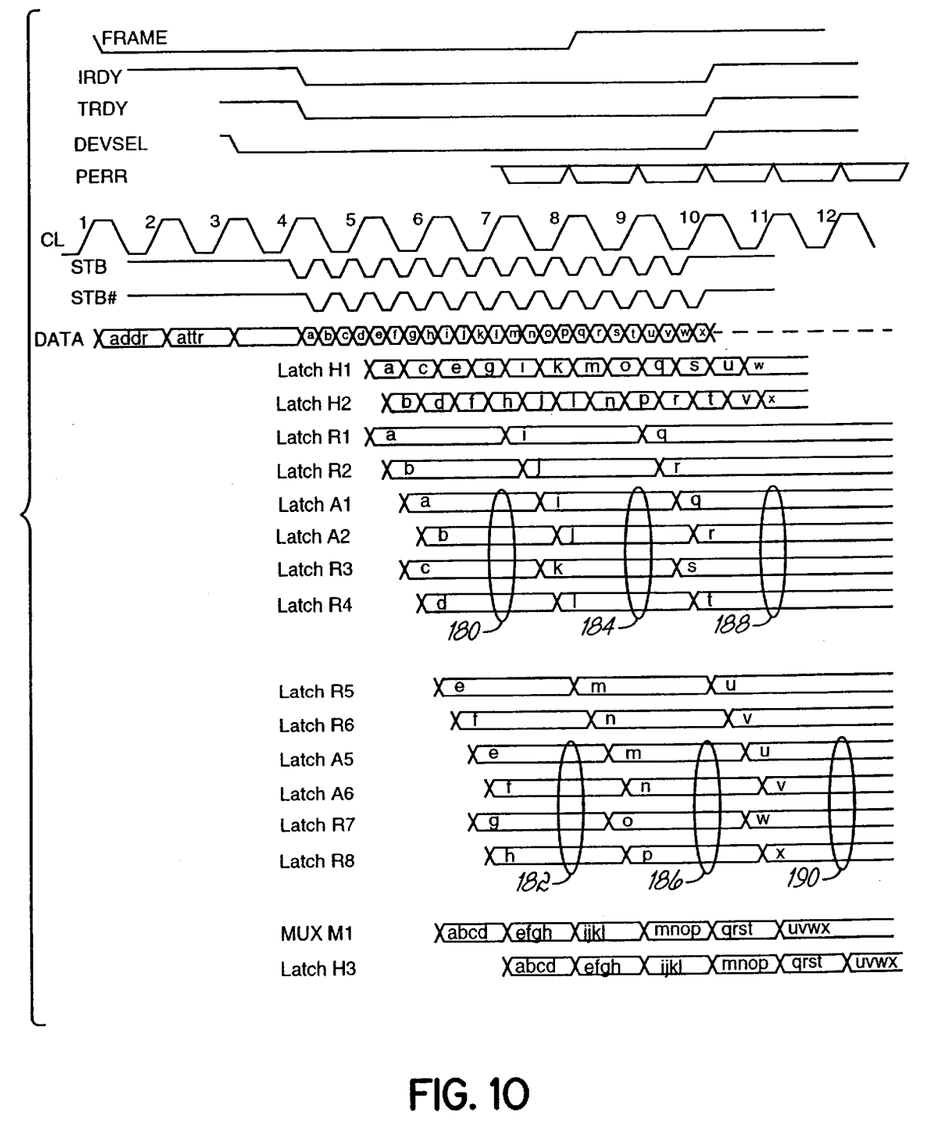
FIG. 10 is a timing diagram illustrating the operation of the input staging logic design of FIG. 9.

As shown in FIG. 10, latching of the data in each clock occurs as shown at 180, 182, 184, 186, 188 and 190. The effect of the addition of latches A1–A2 and A5–A6 is that latching of data in the H3 latch can be obtained in clock 7 with a reduced hold problem with respect to the first sub-phase in each data phase (i.e., the data latched by latches R1 and R5). However, it is possible that the H3 hold problem described above in connection with register 50' may be more pronounced.

Various modifications may be made to the illustrated embodiments without departing from the spirit and scope of the invention. For example, in each of the aforementioned input staging logic implementations, it may be desirable also to bypass the H3 latches in the control of the PERR signal, by utilizing the output of the multiplexer in the generation of the PERR signal by the PCI core logic. Moreover, the output of the H3 latches may be used to pass data through to the DMA FIFO logic directly. Moreover, various combinations of staging register latches, other than those illustrated in logic 50' and 50", may be supplemented with supplemental holding latches as described herein.

Other modifications will be apparent to one of ordinary skill in the art. Therefore, the invention lies in the claims hereinafter appended.

What is claimed is:

1. A circuit arrangement, comprising:
   (a) source synchronous input staging logic configured to receive a source synchronous data signal, the input staging logic including:
      (i) first, second and third latching stages respectively configured to store a plurality of data values from the source synchronous data signal; and
      (ii) sequencer logic coupled to the first, second and third latching stages and configured to sequentially route data values from the source synchronous data signal to the first, second and third latching stages; and
   (b) a common clock synchronizing circuit coupled to the input staging logic and configured to synchronize data from the source synchronous data signal to a common clock signal by sequentially latching data values from the first, second and third latching stages.

2. The circuit arrangement of claim 1, wherein each of the first, second and third latching stages is configured to store a plurality of sub-phases of a data phase from the source synchronous data signal.

3. The circuit arrangement of claim 2, wherein the source synchronous input staging logic is further configured to receive first and second complementary data strobe signals, wherein the source synchronous input staging logic includes first and second source synchronous latches, the first and second source synchronous latches respectively gated by the first and second data strobe signals to store first and second sub-phases of the data signal, and wherein each of the first, second and third latching stages includes at least first and second staging register latches respectively configured to latch outputs of the first and second source synchronous latches responsive to the sequencer logic.

4. The circuit arrangement of claim 3, wherein each of the first, second and third latching stages further includes third and fourth staging register latches, the third staging register latch in each latching stage configured to latch the output of the first source synchronous latch responsive to the sequencer logic, and the fourth staging register latch in each latching stage configured to latch the output of the second source synchronous latch responsive to the sequencer logic.

5. The circuit arrangement of claim 3, wherein the sequencer logic includes first and second portions, the first portion clocked by the first data strobe signal and the second portion clocked by the second data strobe signal, each portion configured to output a plurality of staging strobe signals, each staging strobe signal configured to gate a corresponding staging register latch.

6. The circuit arrangement of claim 5, wherein each portion of the sequencer logic is configured to receive an initial binary pattern, and to sequence the initial binary pattern through the plurality of staging strobe signals output thereby responsive to the corresponding data strobe signal.

7. The circuit arrangement of claim 6, wherein each portion of the sequencer logic is configured to receive one of first and second initial binary patterns to configure the source synchronous input staging logic to operate in one of double data rate and quad data rate modes.

8. The circuit arrangement of claim 1, wherein the common clock synchronizing circuit includes a multiplexer and a plurality of synchronization latches gated by the common clock signal, the multiplexer configured to selectively route data values from the first, second and third latching stages to the plurality of synchronization latches.

9. The circuit arrangement of claim 1, wherein the third latching stage includes first, second, third and fourth staging register latches respectively configured to receive first, second, third and fourth sub-phases from a data phase of the data signal, wherein the sequencer logic is configured to output first, second, third and fourth staging strobe signals respectively configured to gate the first, second, third and fourth staging register latches, the first and third staging strobe signals respectively configured to gate the first and third staging register latches on first and second rising edges of a first source, synchronous data strobe signal, and the second and fourth staging strobe signals respectively configured to gate the second and fourth staging register latches on first and second rising edges of a second source synchronous data strobe signal that is complementary to the first data strobe signal.

10. The circuit arrangement of claim 1, wherein the circuit arrangement is configured to be coupled to a Peripheral Component Interconnect (PCI) bus.

11. The circuit arrangement of claim 10, wherein the PCI bus is compatible with the PCI-X Version 2.0 standard.

12. An integrated circuit device comprising the circuit arrangement of claim 1.

13. A Peripheral Component Interconnect (PCI) compatible device comprising the circuit arrangement of claim 1.

14. A program product, comprising a hardware definition program that defines the circuit arrangement of claim 1; and a signal bearing media bearing the hardware definition program, wherein the signal bearing media includes at least one of a transmission type media and a recordable media.

15. A Peripheral Component Interconnect (PCI) compatible device including a circuit arrangement configured to receive a source synchronous data signal and first and second complementary source synchronous data strobe signals from a PCI compatible bus, the circuit arrangement comprising:
  (a) first and second source synchronous latches, each source synchronous latch including a data input, a data output, and a clock input, the data input of each source synchronous latch configured to receive the data signal, the clock input of the first source synchronous latch configured to receive the first data strobe signal, and the clock input of the second source synchronous latch configured to receive the second data strobe signal;
  (b) sequencer logic including first and second portions, each portion configured to output a plurality of staging strobe signals, the first and second portions respectively clocked by the first and second data strobe signals;
  (c) a first plurality of staging register latches including six staging register latches, each staging register latch in the first plurality of staging register latches including a data input coupled to the data output of the first source synchronous latch, a data output, and a clock input configured to receive one of the plurality of staging strobe signals output by the first portion of the sequencer logic;
  (d) a second plurality of staging register latches including six staging register latches, each staging register latch in the second plurality of staging register latches including a data input coupled to the data output of the second source synchronous latch, a data output, and a clock input configured to receive one of the plurality of staging strobe signals output by the second portion of the sequencer logic; and
  (e) a common clock synchronizing circuit coupled to the data outputs of the staging register latches in the first and second pluralities of staging register latches, the common clock synchronizing circuit including a plurality of common clock synchronized latches, wherein the common clock synchronized circuit is configured to sequentially latch into the plurality of common clock synchronized latches the data outputs of selected staging register latches from the first and second pluralities of staging register latches responsive to a common clock signal.

16. A method of receiving a source synchronous data signal, the method comprising:
  (a) in response to at least one source synchronous data strobe signal, latching a plurality of data values from each of the first, second and third data phases of the source synchronous data signal into first, second and third latching stages, respectively; and
  (b) synchronizing the plurality of data values from the first, second and third data phases with a common clock by sequentially latching in response to a common clock signal the data values latched into each of the first, second and third latching stages.

17. The method of claim 16, wherein each data value is representative of a sub-phase of one of the data phases of the source synchronous data signal.

18. The method of claim 17, wherein latching the plurality of data values is performed responsive to first and second complementary source synchronous data strobe signals, wherein each of the first, second and third latching stages includes at least first and second staging register latches respectively configured to latch data values aligned with the first and second data strobe signals.

19. The method of claim 18, wherein each of the first, second and third latching stages further includes third and fourth staging register latches respectively configured to latch data values aligned with the first and second data strobe signals.

20. The method of claim 18, wherein latching the plurality of data values into the first, second and third latching stages is performed in response to sequencer logic that includes first and second portions, the portion clocked by the first data strobe signal and the second portion clocked by the second data strobe signal, each portion configured to output a plurality of staging strobe signals, each staging strobe signal configured to gate a corresponding staging register latch.

21. The method of claim 16, wherein the common clock synchronizing circuit includes a multiplexer and a plurality of synchronization latches gated by the common clock signal, the multiplexer configured to selectively route data values from the first, second and third latching stages to the plurality of synchronization latches.

22. The method of claim 16, wherein the third latching stage includes first, second, third and fourth staging register latches respectively configured to receive first, second, third and fourth sub-phases from a data phase of the data signal, wherein latching data values into the third latching stage includes gating the first and third staging register latches on first and second rising edges of a first source synchronous data strobe signal, and gating the second and fourth staging register latches on first and second rising edges of a second source synchronous data strobe signal that is complementary to the first data strobe signal.

23. A method of receiving a source synchronous data signal from a Peripheral, Component Interconnect (PCI)-compatible bus, the method comprising:
  (a) in response to first and second quad data rate (QDR) source synchronous data strobe signals, latching first, second, third and fourth data values from each of first, second and third data phases of the source synchronous data signal into first, second and third latching stages, respectively; and
  (b) synchronizing the data values from each of the first, second and third data phases with a common clock by controlling a multiplexer to sequentially pass the outputs of the first, second, and third latching stages to a plurality of common clock synchronization latches gated by the common clock.

24. A circuit arrangement, comprising:
  (a) source synchronous input staging logic configured to receive a source synchronous data signal, the input staging logic including:
  (i) first and second latching stages respectively configured to store a plurality of data values from first and second data phases of the source synchronous data signal, the first latching stage including first and second staging register latches, the second staging register latch configured to receive data from a later sub-phase of the first data phase than the first staging register latch; and
  (ii) sequencer logic coupled to the first and second latching stages and configured to sequentially route data values from the source synchronous data signal to the first and second latching stages at least in part by selectively gating the first and second staging register latches; and (b) a common clock synchronizing circuit coupled to the input staging logic and configured to synchronize data from the source synchronous data signal to a common clock signal by sequentially latching data values from the first and second latching stages;

wherein the input staging logic further includes at least one supplemental holding latch coupled intermediate an output of the first staging register latch and the common clock synchronizing circuit, the supplemental holding latch gated by the sequencer logic to latch the output of the first staging register latch concurrently with gating of the second staging register latch.

25. The circuit arrangement of claim 24, wherein the first and second staging register latches are configured to receive data from first and second sub-phases of the first data phase, wherein the first latching stage further includes third and fourth staging register latches respectively configured to receive data from third and fourth sub-phases of the first data phase, wherein the fourth staging register latch is configured to receive data from a later sub-phase of the first data phase than the third staging register latch, and wherein the input staging logic further includes a second supplemental holding latch coupled intermediate an output of the third staging register latch and the common clock synchronizing circuit, the second supplemental holding latch gated by the sequencer logic to latch the output of the third staging register latch concurrently with gating of the fourth staging register latch.

26. The circuit arrangement of claim 24, wherein the first latching stage further includes third and fourth staging register latches, each configured to receive data from earlier sub-phases of the first data phase than the second staging register latch, and wherein the input staging logic further includes a second and third supplemental holding latches, the second supplemental holding latch coupled intermediate an output of the third staging register latch and the common clock synchronizing circuit, the third supplemental holding latch coupled intermediate an output of the fourth staging register latch and the common clock synchronizing circuit, the second and third supplemental holding latches gated by the sequencer logic to latch the outputs of the third and fourth staging register latches concurrently with gating of the second staging register latch.

27. The circuit arrangement of claim 24, wherein the circuit arrangement is configured to be coupled to a Peripheral Component Interconnect (PCI) bus that is compatible with the PCI-X Version 2.0 standard.

28. An integrated circuit device comprising the circuit arrangement of claim 24.

29. A Peripheral Component Interconnect (PCI) compatible device comprising the circuit arrangement of claim 24.

30. A program product, comprising a hardware definition program that defines the circuit arrangement of claim 24, and a signal bearing media bearing the hardware definition program, wherein the signal bearing media includes at least one of a transmission type media and a recordable media.

31. A method of receiving a source synchronous data signal, the method comprising:

(a) in response to at least one source synchronous data strobe signal, latching a plurality of data values from each of first and second data phases of the source synchronous data signal into first and second latching stages, respectively, wherein latching the data values from the first data phase into the first latching stage includes:

(i) latching a first data value into a first staging register latch during a first sub-phase of the first data phase;

(ii) latching a second data value into a second staging register latch during a second sub-phase of the first data phase; and (iii) concurrently with latching the second data value into the second staging register latch, latching the first data value into a supplemental holding latch coupled to an output of the first staging register latch; and (b) synchronizing the plurality of data values from the first and second data phases with a common clock by sequentially latching in response to a common clock signal the data values latched into each of the first and second latching stages.

32. The method of claim 31, wherein latching the data values from the first data phase into the first latching stage further includes:

(a) latching a third data value into a third staging register latch during a third sub-phase of the first data phase;

(b) latching a fourth data value into a fourth staging register latch during a fourth sub-phase of the first data phase; and (c) concurrently with latching the fourth data value into the fourth staging register latch, latching the third data value into a second supplemental holding latch coupled to an output of the third staging register latch.

33. The method of claim 31, wherein latching the data values from the first data phase into the first latching stage further includes:

(a) latching a third data value into a third staging register latch during a third sub-phase of the first data phase, wherein the third sub-phase precedes the second sub-phase;

(b) latching a fourth data value into a fourth staging register latch during a fourth sub-phase of the first data phase, wherein the fourth sub-phase precedes the second sub-phase; and (c) concurrently with latching the second data value into the second staging register latch, latching the third data value into a second supplemental holding latch coupled to an output of the third staging register latch, and latching the fourth data value into a third supplemental holding latch coupled to an output of the fourth staging register latch.

* * * * *